US012249919B2

(12) United States Patent
Guo et al.

(10) Patent No.: US 12,249,919 B2
(45) Date of Patent: Mar. 11, 2025

(54) CONTROL CIRCUIT, SYSTEM AND METHOD FOR SWITCHED-MODE POWER SUPPLY (71) Applicant: SHANGHAI BRIGHT POWER SEMICONDUCTOR CO., LTD., Shanghai (CN)

(72) Inventors: Yanmei Guo, Shanghai (CN); Yihui Chen, Shanghai (CN); Haifeng Miao, Shanghai (CN); Yuehui Li, Shanghai (CN); Xiaoru Gao, Shanghai (CN); Zhen Zhu, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 76 days.

(21) Appl. No.: 18/240,861

(22) Filed: Aug. 31, 2023

(65) Prior Publication Data

US 2023/0412082 A1 Dec. 21, 2023

Related U.S. Application Data (63) Continuation-in-part of application No. 17/555,096, filed on Dec. 17, 2021, now Pat. No. 11,799,379.

(30) Foreign Application Priority Data

Dec. 31, 2020 (CN) .......................... 202011625428.7

(51) Int. Cl.
H02M 3/335 (2006.01)
H02M 1/00 (2006.01)
(Continued)

(52) U.S. Cl.
CPC ..... *H02M 3/33507* (2013.01); *H02M 1/0032* (2021.05); *H02M 1/0054* (2021.05);
(Continued)

(58) Field of Classification Search
CPC .......... H02M 3/33507; H02M 1/0032; H02M 1/0054; H02M 1/08
See application file for complete search history.

(56) References Cited

U.S. PATENT DOCUMENTS 10,027,236 B1 * 7/2018 Gaknoki .......... H02M 3/33592
2010/0008109 A1   1/2010 Morota
(Continued)

FOREIGN PATENT DOCUMENTS

CN 102480227 A 5/2012
CN 102570817 A 7/2012
(Continued)

OTHER PUBLICATIONS

Huang et al., Primary-side feedback control IC design for flyback converter with energy saving burst mode, 2018 IEEE Applied Power Electronics Conference and Exposition (APEC), IEEE, Mar. 4, 2018, pp. 2054-2061.

*Primary Examiner* — Adolf D Berhane
*Assistant Examiner* — Afework S Demisse
(74) *Attorney, Agent, or Firm* — MUNCY, GEISSLER, OLDS & LOWE, P.C.

(57) ABSTRACT

A control circuit, system and method for switched-mode power supply are disclosed, the control circuit is for driving a first switch to convert an input voltage into an output voltage. The control circuit includes an on-time control unit, which receives a first signal characterizing switching frequency of first switch and a second signal characterizing current flowing through first switch and responsively generates a signal indicative of a turn-off instant for first switch. When a peak value of the current flowing through the first switch drops below a predefined value, the on-time control unit determines the turn-off instant for the first switch based on the first signal so that the switching frequency of the first switch is maintained at a target frequency. This design can (Continued)

effectively avoid the generation of audible noise, stabilize the output voltage against load changes while maintaining desirable efficiency, and ensure operational safety of the switched-mode power supply.

19 Claims, 6 Drawing Sheets

(51) Int. Cl.
*H02M 1/08* (2006.01)
*H02M 1/32* (2007.01)
*H02M 1/44* (2007.01)

(52) U.S. Cl.
CPC ............... *H02M 1/08* (2013.01); *H02M 1/32* (2013.01); *H02M 1/44* (2013.01)

(56) References Cited

U.S. PATENT DOCUMENTS

| | | | |
|---|---|---|---|
| 2010/0219802 A1* | 9/2010 | Lin | ............. H02M 3/33507 |
| | | | 323/284 |
| 2014/0035654 A1 | 2/2014 | Jiang et al. | |
| 2014/0055106 A1 | 2/2014 | Chen | |
| 2015/0194896 A1 | 7/2015 | Stuler et al. | |
| 2015/0280557 A1 | 10/2015 | Xue et al. | |
| 2018/0091046 A1 | 3/2018 | Krueger et al. | |

FOREIGN PATENT DOCUMENTS

| | | |
|---|---|---|
| CN | 107508465 A | 12/2017 |
| CN | 108282084 A | 7/2018 |
| CN | 108390562 A | 8/2018 |
| CN | 108667291 A | 10/2018 |
| CN | 111030468 A | 4/2020 |
| CN | 111224546 A | 6/2020 |
| CN | 111865299 A | 10/2020 |
| JP | 2016140168 A | 8/2016 |

* cited by examiner

CONTROL CIRCUIT, SYSTEM AND METHOD FOR SWITCHED-MODE POWER SUPPLY

CROSS REFERENCE TO RELATED APPLICATIONS

This application is a Continuation-in-Part of co-pending application Ser. No. 17/555,096 filed on Dec. 17, 2021 for which priority is claimed under 35 U.S.C. § 120; and this application claims priority of Application No. 202011625428.7 filed in CHINA on Dec. 31, 2020 under 35 U. S. C. § 119, the entire contents of all of which are hereby incorporated by reference.

TECHNICAL FIELD

The present invention relates to the field of electronic circuits, and particularly to a control circuit, control method and system for a switched-mode power supply.

BACKGROUND

In the field of switched-mode power supplies, the currently common control methods include voltage control, current control, and constant on-time (COT) control. Among these, COT control is particularly extensively used thanks to its excellent transient load response and simple circuit structure. Conventionally, COT control turned on a transistor switch when an output voltage of the switched-mode power supply was lower than a reference signal and turned the transistor switch off upon the expiry of a predetermined on-time period. The conventional COT control for switched-mode power supplies featured a lower switching frequency at lighter load, which might enter the audio range (e.g., 200 Hz-20 kHz) and thus introduce audible noise. Moreover, an increased input voltage could raise a current flowing through the COT-controlled transistor switch to an excessive level. When the load is further reduced to a light or no-load state, such as below 10% of the rated load, it is necessary to control the switching loss to improve the overall efficiency of the switching power supply and reduce standby power consumption. Therefore, there is a need for new control circuits and methods capable of avoiding audible noise while maintaining desirable operating efficiency and safety.

SUMMARY OF THE INVENTION

It is an objective of the present invention to provide a control circuit, method and system for a switched-mode power supply, which can avoid the generation of audible noise that is audible by human ears due to load and input-voltage changes during operation of the switched-mode power supply, reduce switching loss of the switched-mode power supply, limit a peak current flowing through a transistor switch and enhance performance of the switched-mode power supply.

A control circuit of a switched-mode power supply for driving a first switch in the switched-mode power supply to convert an input voltage into an output voltage according to an embodiment of the present invention is characterized in including an on-time control unit, which receives a first signal and a second signal, the first signal characterizing a current limiting value and the second signal characterizing a current flowing through the first switch to select an operating mode of the switched-mode power supply based on the first signal and the second signal, wherein the on-time control unit compares the current flowing through the first switch with a first reference current value generated based on the current limiting value and the switched-mode power supply is configured to be in a first operating mode when a peak value of the current flowing through the first switch does not surpass the first reference current value, and wherein the on-time control unit determines a turn-off instant for the first switch based on the instant of that the current flowing through the first switch increases to the first reference current value in the first operating mode, so that the peak current flowing through the first switch is able to reach the first reference current value.

In one embodiment, the on-time control unit further receives a third signal, the third signal indicating the turn-off instant for the first switch, when the peak current flowing through the first switch reaches the first reference value and is less than a second reference current value generated according to the current limit value, the switched-mode power supply is in a second operating mode, the on-time control unit determines the turn-off instant for the first switch based on the third signal.

In one embodiment, the on-time control unit comprises an on-time generator, which receives a switching frequency detection signal and a reference frequency signal and generates the third signal based on a difference between the reference frequency signal and the switching frequency detection signal, thereby reducing the difference between the reference frequency signal and the switching frequency detection signal, wherein the switching frequency detection signal characterizes the switching frequency of the first switch, and the reference frequency signal represents a target frequency value.

In one embodiment, the on-time control unit may include an on-time generator, which generates the third signal based on a preset reference value, so that the switching frequency of the first switch remains unchanged.

In one embodiment, the first reference current value is smaller than the second reference current value.

In one embodiment, the on-time control unit may include a current limiter, which receives the first signal and the second signal, and generates a first current limiting signal and a second current limiting signal, wherein the first current limiting signal indicates an instant when the current flowing through the first switch increases to the current limiting value, and the second current limiting signal indicates an instant when the current flowing through the first switch increases to the first reference current value.

In one embodiment, the current limiter may include a first comparison unit and a second comparison unit, the first comparison unit receiving the first signal and the second signal, and generating a first current limiting signal when the current flowing through the first switch is greater than the current limiting value; the second comparison unit receiving the first reference current value and the second signal, and generating a second current limiting signal when the current flowing through the first switch is greater than the first reference current value.

In one embodiment, the on-time generator may include: a frequency error signal generator, which receives the switching frequency detection signal and the reference frequency signal and generates a frequency error signal characterizing the difference between the reference frequency signal and the switching frequency detection signal; an on-time adjustment generator, which receives the frequency error signal and generates, based on the frequency error signal, an amount of on-time adjustment to be made to a current period; and a timer circuit, which generates the third signal based on the amount of on-time adjustment.

In one embodiment, the amount of on-time adjustment generated based on the frequency error signal causes the timer circuit to postpone the turn-off instant for the first switch when the frequency error signal indicates that the switching frequency is higher than the target frequency and to advance the turn-off instant for the first switch when the frequency error signal indicates that the switching frequency is lower than the target frequency.

In one embodiment, the control circuit may further include an off-time control unit, which receives a fourth signal characterizing the output voltage, compares the fourth signal with a reference voltage signal, and generates a signal indicative of a turn-on instant for the first switch.

In one embodiment, the control circuit may further include a first logic circuit, which receives both the signal indicative of the turn-off instant for the first switch and the signal indicative of the turn-on instant for the first switch and generates a control signal for the first switch.

A control system for a switched-mode power supply according to an embodiment of the present invention includes a switching element, a freewheeling element and an energy storage element and is used to convert an input voltage into an output voltage. The control system is characterized in further including an on-time control unit, the on-time control unit receiving a first signal and a second signal, the first signal characterizing a current limiting value and the second signal characterizing a current flowing through the first switch to select an operating mode of the switched-mode power supply based on the first signal and the second signal, wherein the on-time control unit compares the current flowing through the first switch with the first reference current value generated based on the current limiting value and the switched-mode power supply is configured to be in a first operating mode when a peak value of the current flowing through the first switch does not surpass the first reference current value, and wherein the on-time control unit determines the turn-off instant for the first switch based on the instant of that the current flowing through the first switch increases to the first reference current value in the first operating mode, thereby maintaining that the peak current flowing through the first switch is not lower than the first reference current value.

In one embodiment, the switched-mode power supply may be an isolated switched-mode power supply including a primary-side circuit and a secondary-side circuit, which are connected to different ground terminals, wherein the switching element and the on-time control unit are both electrically connected to the primary-side circuit, and the freewheeling element is connected to the secondary-side circuit.

In one embodiment, the on-time control unit may further include an on-time generator, which generates a third signal, the third signal indicating the turn-off instant for the first switch; a current limiter, which receives the first signal and the second signal, and generates a first current limiting signal and a second current limiting signal, wherein the first current limiting signal indicates the instant when the current flowing through the first switch increases to the current limiting value, and the second current limiting signal indicates the instant when the current flowing through the first switch increases to the first reference current value; and a second logic circuit, which receives the first current limiting signal, the second current limiting signal and the third signal, and indicates that the switching element is turned off when the first current limiting signal arrives if the third signal is received before the first current limiting signal.

A control method for a switched-mode power supply for driving a first switch in the switched-mode power supply to alternately turn on and off, thereby converting an input voltage into an output voltage, the control method according to an embodiment of the present invention is characterized in including: detecting a current flowing through the first switch; when a peak value of the current flowing through the first switch does not surpass the first reference current value, configuring the switched-mode power supply to be in a first operating mode, in which the on-time control unit determines the turn-off instant for the first switch based on the instant of that the current flowing through the first switch increases to the first reference current value, thereby maintaining that the peak current flowing through the first switch is not lower than the first reference current value.

In one embodiment, when the peak value of the current flowing through the first switch reaches a second reference current value, the turn-off instant for the first switch may be determined based on the instant of time when the peak value of the current reaches the second reference current value.

According to embodiments of the present invention, under heavy load conditions, a frequency modulation control mode is activated in which the switching frequency is lowered in response to decrease in load and an on-time length of the switch is determined based on a current flowing through the switching element or energy storage element. When the switching frequency drops into the audio range, operation is switched to a frequency-locked mode in which the switch's on-time length is adaptively adjusted to maintain the switching frequency at a predetermined value above the audio range, thus effectively avoiding the generation of audible noise. In the frequency-locked mode, the switch's on-time duration is adjusted in adaptation to various load conditions to keep the switching frequency substantially constant and ensure that the current flowing through the switch does not exceed a preset value. Under even lighter load conditions that bring the on-time length to or below its lower limit, operation is switched back to the frequency modulation control mode to further reduce switching loss and achieve improved efficiency. Although this makes it possible for the switching frequency to lie in the audio range, since little energy is present in the switched-mode power supply system under light load, the generation of noticeable noise can be still avoided, ensuring good user experience. In this way, the generation of audible noise can be effectively avoided under all load conditions, and high efficiency and operational safety of the switched-mode power supply can be ensured.

DETAILED DESCRIPTION

An overvoltage protection circuit and method and a switched-mode power supply proposed in the present invention will be described in detail below by way of specific embodiments with reference to the accompanying drawings. Advantages and features of the present invention will become more apparent from the following description. Note that the figures are provided in a very simplified form not necessarily drawn to exact scale for the only purpose of helping to explain the embodiments disclosed herein in a more convenient and clearer way. It is to be also noted that the phrases "time", "on-time length" and "on-time" all refer to a duration or length of time, and the phrases "instant", "at the time of . . . " and "turn-off instant" all refer to a time point, i.e., an instant of time when a certain event takes place. The phrase "a given signal indicative of . . . " refers to a non-zero electrical level that indicates a certain component or module to take a corresponding action. The phrase "the arrival of . . . signal" means that an effective level of a given signal is received by a module or unit.

Figure 1:
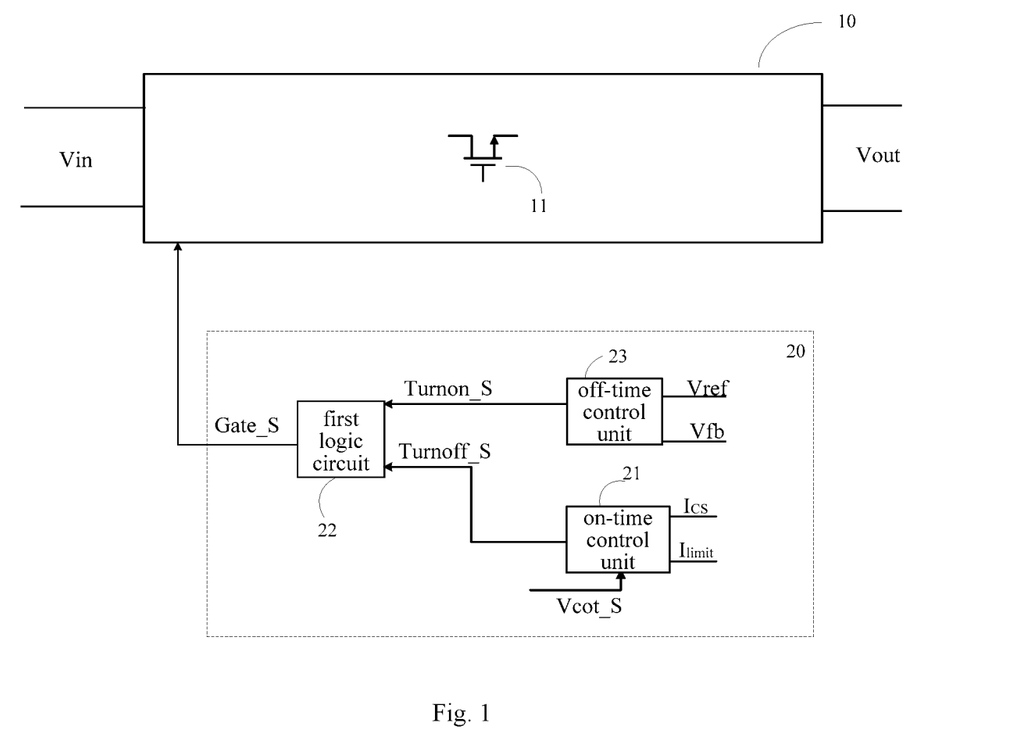
FIG. 1 is a structural schematic diagram of a control circuit according to an embodiment of the present invention.

FIG. 1 illustrates a conceptual diagram of a control circuit according to an embodiment of the present invention. The control circuit 20 is used to control a switched-mode power supply 10 including a first switch 11 and to convert an input voltage Vin into an output voltage Vout for driving a load (not shown) by turning on and off the first switch 11. The switched-mode power supply 10 may be an isolated/non-isolated AC/DC converter intended to output a substantially constant output voltage Vout. Alternatively, the switched-mode power supply 10 may be an isolated/non-isolated DC-DC converter also intended to output a substantially constant output voltage Vout. The control circuit includes: an on-time control unit 21 for generating a signal Turnoff_S indicative of a turn-off instant for the first switch; an off-time control unit 23 for generating a signal Turnon_S indicative of a turn-on instant for the first switch; and a first logic circuit 22. The on-time control unit 21 receives a first signal $I_{limit}$ and a second signal $I_{CS}$, the first signal $I_{limit}$ characterizes a current limiting value which can be either generated by the internal reference of the control circuit or introduced from external control circuit, the second signal $I_{CS}$ characterizes a current flowing through the first switch, which is obtained by detection. Based on a detection of the magnitude of the second signal $I_{CS}$, when a peak value of the current flowing through the first switch does not surpass a reference current value, the switched-mode power supply is in the first operating mode, the on-time control unit 21 determines the turn-off instant for the first switch according to the instant when the second signal $I_{CS}$ increases to the first reference current value, in order to maintain that the peak current flowing through the first switch is not lower than the first reference current value. In this embodiment, the first reference current value is a reference value proportional to the current limiting value, which can be obtained by processing the first signal $I_{limit}$ through a voltage divider or multiplier. For example, when the load is light (such as when the load current is less than 10% of the rated output current), the current flowing through the first switch 11 is also small. At this time, the switching loss of the switched-mode power supply is mainly caused by the switching of the switch. In this operating mode, by controlling the conduction time of the first switch 11 for the $I_{CS}$ rising to the first reference current value, the peak current flowing through the first switch can reach the first reference current value. As the conduction time of the first switch 11 increases, the switching frequency is appropriately reduced compared to the condition where the first reference current value is not set, and the switching loss is reduced accordingly, Furthermore, it improves the efficiency of the switched-mode power supply under light load conditions. On the other hand, in a heavy load condition (leading to a large output current from the switched-mode power supply), the current flowing through the first switch is relatively large. At this point, the control circuit 20 can ascertain the heavy load condition by performing a detection on the second signal $I_{CS}$ characterizing the current flowing through the first switch and responsively identify a need to limit the load current. Adaptiveness to such load conditions is accomplished by frequency modulation control in which the switching frequency is reduced in response to any decrease in load, reducing the energy delivered to the output side. However, when the load decreases below a predetermined value, the switching frequency of the control circuit 20 is lowered to and maintained at a predetermined reference frequency, e.g., within the range of 22-28 kHz, in order to avoid audible noise. Moreover, the signal Turnon_S indicative of the turn-on instant for the first switch is determined by the off-time control unit 23 based on a detected feedback voltage signal Vfb reflecting the output voltage Vout and a predefined reference voltage Vref. The first logic circuit 22 generates a control signal Gate_S for turning on or off the first switch 11 by processing the signal Turnon_S or Turnoff_S. In some embodiments of the present invention, the off-time control unit 23 may determine the turn-on instant for the first switch 11 alternatively based on a fixed-frequency short pulse signal or any other detected signal that can suitably reflect the output voltage Vout. In some embodiments of the present invention, the switching frequency signal $f_{SW}$ may originate from the control signal Gate_S for the first switch 11, the signal Turnon_S indicative of the turn-on instant for the first switch, or a combination of the two.

The following equations that describe the principles of the control circuit of the present invention help more clearly explain the beneficial effects of the circuit. In a particular example where the circuit is a buck-type one, the current Ipeak through the first switch may be expressed as:

$$Ipeak = \frac{Vin}{L} Ton,$$

where L represents an inductor configured to store energy in the switched-mode power supply, and Ton is an on-time duration within one period of the first switch 11.

This is combined with an energy transfer expression of the switched-mode power supply to give:

$$Po = Vout * Io = \frac{1}{2} L Ipeak^2 f = \frac{1}{2} L \left(\frac{Vin}{L} Ton\right)^2 f,$$

where Po represents energy provided by the switched-mode power supply to the load, which is the product of the output voltage Vout and the load current Jo, and f represents the switching frequency of the first switch 11.

As can be seen from the above expression, given a fixed switching frequency f, rapid response to any load change, as well as effective avoidance of the generation of audible noise, can be achieved by adjusting the switch's on-time Ton. Coupled with frequency modulation control under heavy load conditions, desirable efficiency can be maintained under all load conditions, resulting in improved overall performance of the switched-mode power supply.

A method of adjusting the switch's on-time length according to another embodiment of the present invention will be described below with reference to FIG. 2.

As shown, when the peak value of the current flowing through the first switch drops below the predefined value, the on-time control unit 21 adjusts the turn-off instant for the first switch based on the first signal $I_{limit}$ and the second signal $I_{CS}$ to maintain that the peak current flowing through the first switch is not lower than the first reference current value. The first signal $I_{limit}$ characterizes a current limiting value which can be either generated by the internal reference of the control circuit or introduced from external control circuit, the second signal $I_{CS}$ characterizes a current flowing through the first switch, which is obtained by detection. The control circuit 20 may include an on-time generator 26 configured to output an on-time signal Vcot_S for indicating the turn-off of the first switch 11. The on-time signal Vcot_S can be generated based on the difference between a reference frequency value and the detected switch frequency value of the first switch 11, thereby adaptively changing the turn-off instant of the first switch 11. The Vcot_S signal can also be generated based on a fixed turning-on time, indicating that the first switch 11 is turned off after the same turning-on time. The on-time control unit 21 may further include a current limiter 24 and a second logic circuit 25. The current limiter 24 may receive the second signal $I_{CS}$ and a current limiting value $I_{limit}$, and if the peak value of the current flowing through first switch is smaller than the reference current of the first reference current value generated based on the current limiting value (i.e. light load condition or no-load standby condition), the switched-mode power supply is in the first operating mode, the current limiter 24 instructs the second logic circuit 25 by means of a signal Vcsmin_S to delay the turn-off instant for the first switch, the power is continuously transmitted to the output end, causing the current in the converter to increase until the value of the second signal $I_{CS}$ rises to the first reference current value. As the turning-on time of the first switch 11 prolongs, the switching frequency is appropriately reduced compared to the situation where the first reference current value is not set, resulting in a decrease in switching losses and thus improving the efficiency of the switched-mode power supply under light load conditions. When the peak current flowing through the first switch is greater than the first reference current value generated based on the current limiting value and smaller than the second reference current value generated based on the current limiting value, the switched-mode power supply is in a second operating mode, where the first reference current value is smaller than the second reference current value. In the second operating mode, the second logic circuit 25 determines the turn-off instant for the first switch 11 (i.e., to determine the on time of the first switch 11) based on the signal Vcot_S output from the on-time generator 26, so that the on time of the first switch 11 remains unchanged, or to adaptively change the on time to maintain the switch frequency unchanged.

Specifically, in some embodiments of the present invention, based on the difference between the reference frequency and the switching frequency, the on-time generator 26 may change the turn-off instant (and hence the on-time) for the first switch 11 in a cycle-by-cycle way. For example, when the switching frequency is higher than the reference frequency, the on-time generator may postpone the turn-off instant for the first switch by one unit interval. When the switching frequency is lower than the reference frequency, the on-time generator may advance the turn-off instant for the first switch by one unit interval. In this way, smoothness of on-time adjustment can be maximized, allowing the switched-mode power supply to operate in a stable manner. In some other embodiments of the present invention, based on the difference between the reference frequency and the switching frequency, the on-time generator 26 may change the turn-off instant (and hence the on-time) for the first switch 11 in a cycle-by-cycle way, wherein the adjustment of on-time is in proportion to the difference between the reference frequency and the switching frequency. For example, when the switching frequency is higher than the reference frequency, the on-time generator 26 may postpone the turn-off instant for the first switch by a period of time in proportion to the difference between the reference frequency and the switching frequency. When the switching frequency is lower than the reference frequency, the on-time generator 26 may advance the turn-off instant for the first switch by a period of time in proportion to the difference between the reference frequency and the switching frequency. In this way, the switch's on-time adjustment can be speeded up, resulting in improved performance of the switched-mode power supply. Of course, the on-time generator 26 may also adjust the switch's on-time once every several periods, as may be required in practice, and may be configured to do so by the on-time control unit 21. As a result, in steady-state operation of the switched-mode power supply 10, the switching frequency of the first switch is maintained at the reference frequency, effectively avoiding the generation of audible noise.

Figure 2:
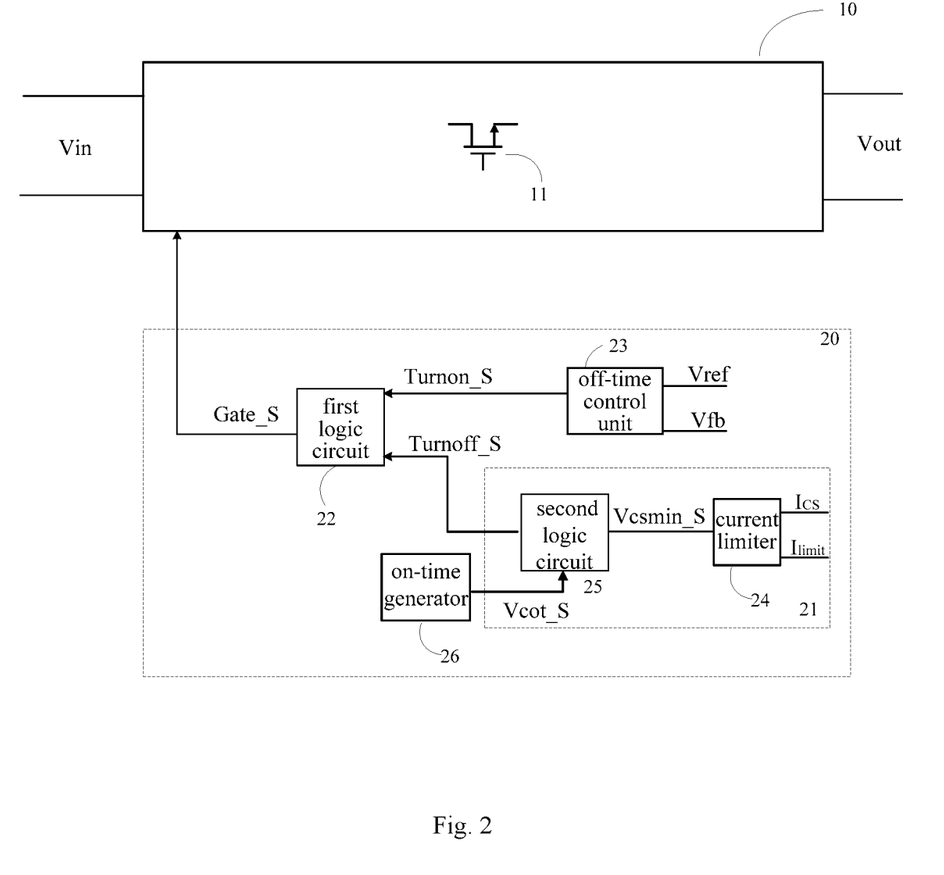
FIG. 2 is a structural schematic of the control circuit according to another embodiment of the present invention.
Figure 3:
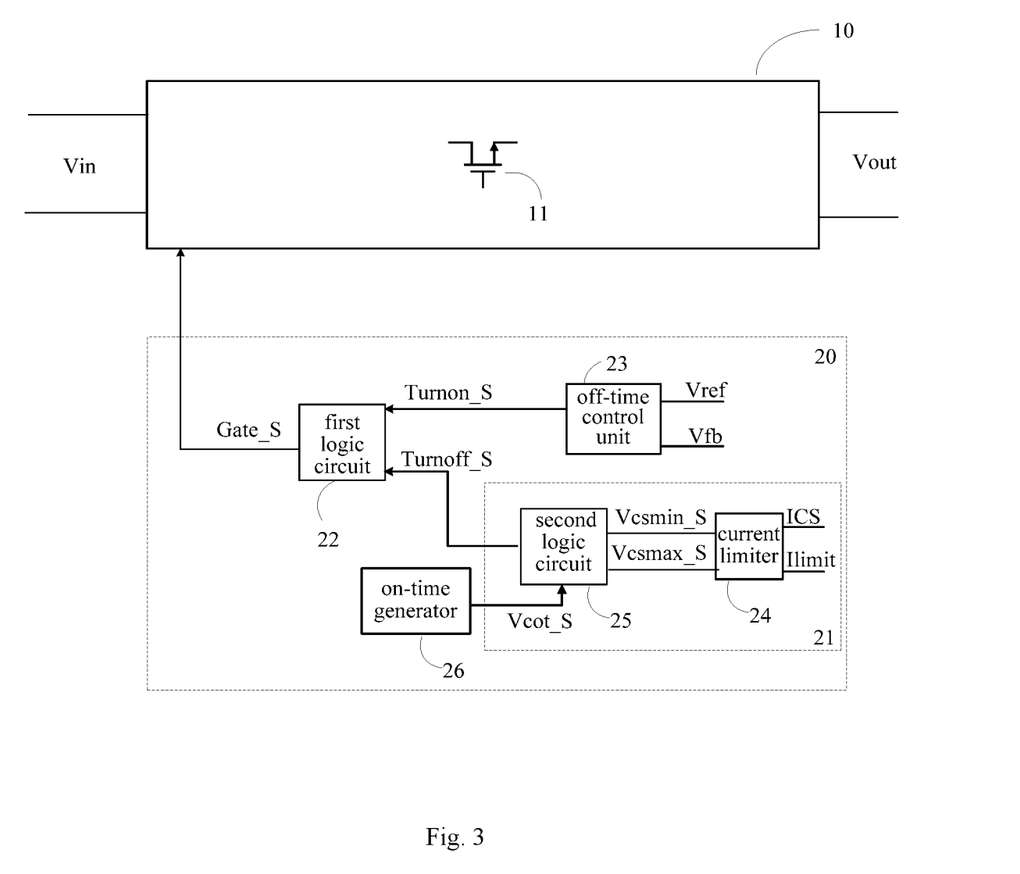
FIG. 3 is a structural schematic of the control circuit according to yet another embodiment of the present invention.

As shown in FIGS. 2-3, The switched-mode power supply operates in either the first or second operating mode and can be indicated by one or multiple signals. As shown in FIG. 2, the current limiter 24 compares the second signal $I_{CS}$ with the first and second reference current values generated based on the current limiting signal $I_{limit}$, and outputs the signal Vcsmin_S. For example, the signal Vcsmin_S can be a square wave signal with different levels, indicating the instant when the peak value of the second signal $I_{CS}$ (i.e. the current detection value flowing through the first switch 11) reaches the first reference current value and the second reference current value by setting the rising and falling edges, and the signal Vcsmin_S can be sent to the second logic circuit 25 to determine whether the switched-mode power supply is operating in the first or second operating mode. As shown in FIG. 3, the current limiter compares the second signal $I_{CS}$ with the first and second reference current values generated based on the current limiting signal $I_{limit}$, and outputs the signal Vcsmin_S and the signal Vcsmax_S respectively indicating the instant when the peak value of the second signal $I_{CS}$ (i.e. the current detection value flowing through the first switch 11) reaches the first reference current value and the second reference current value, and the signal Vcsmin_S and the signal Vcsmax_S can be sent to the second logic circuit 25 to determine whether the switched-mode power supply is operating in the first or second operating mode.

Figure 4:
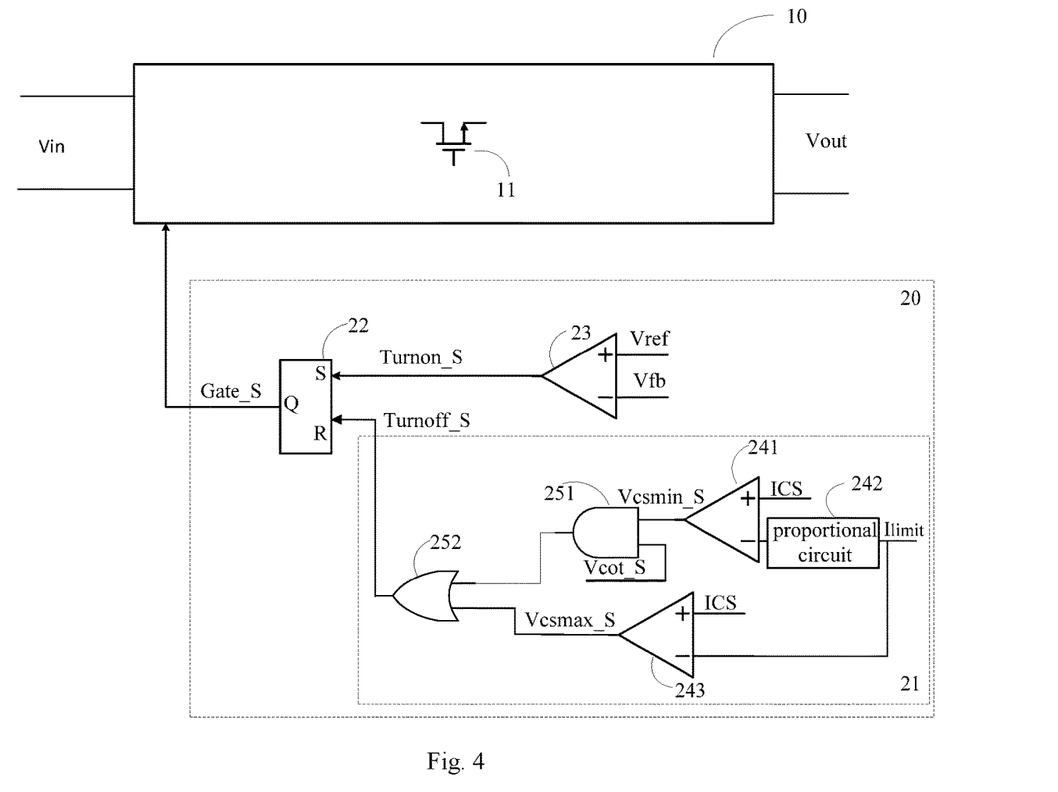
FIG. 4 is a structural schematic of the control circuit according to a further embodiment of the present invention.

Referring with FIGS. 3 and 4, an exemplary explanation can be provided of the specific implementation method of the current limiter 24 in a further embodiment of the present invention. In which the current limiter 24 may specifically be implemented as comparators 241 and 243, the second signal $I_{CS}$ is coupled to the positive input of the comparators 241 and 243 and the current limiting signal $I_{limit}$ is processed by the proportional circuit 242 and is coupled to the negative input of the comparator 241 as the first reference current value. The current limiting signal $I_{limit}$ is connected to the negative input of comparator 243 as the second reference current value. In other embodiments, the current limiting signal $I_{limit}$ can also be processed by different proportional circuits to obtain a first reference current value and a second reference current value, which are respectively input into the comparators 241 and 243, ensuring that the first reference current value is less than the second reference current value. If the peak value of the second signal $I_{CS}$ (i.e. the current detection value flowing through the first switch 11) is smaller than the first reference current value, the output signal Vcsmin_S of the current limiter 24 may be set at low level. Otherwise, it may be set at high level. If the peak value of the second signal $I_{CS}$ (i.e. the current detection value flowing through the first switch 11) is smaller than the second reference current value, the output signal Vcsmax_S of the current limiter 24 may be set at low level. Otherwise, it may be set at high level. The second logic circuit 25 may be implemented as a combination of logic AND gate 251 and logic OR gate 252 as shown in FIG. 4, as multiple logic devices that are combined together to function the same.

Specifically, the second logic circuit 25 is configured that when the peak value of the current detection value flowing through the first switch 11 is smaller than the first reference current value, the output signal Turnoff_S of the second logic circuit 25 does not change based on the output signal Vcot_S of the on-time generator 26. Instead, the output signal Turnoff_S of the second logic circuit 25 changes based on the instant when the current detection value flowing through the first switch 11 rises to the first reference current value. Before this instant arrives, the first switch is kept turned-on to ensure that the current flowing through the first switch 11 can reach the first reference current value. As the turning-on time of the first switch 11 extends, the switching frequency is appropriately reduced compared to the condition where the first reference current value and related logic circuits are not set, resulting in a decrease in the switching loss of the first switch, thereby improving the efficiency of the switching power supply in light load and idle standby states. When the peak value of the second signal $I_{CS}$ reaches the first reference value and is smaller than the second reference current value generated based on the current limiting value, the switched-mode power supply is in the second operating mode, and the turning-on time control unit determines the turning-off instant of the first switch according to the signal Vcot_S indicating the turning off of the first switch 11. As shown in FIG. 4, in one embodiment, the second logic circuit 25 may include a logical AND gate 251 and a logic OR gate 252. When the output signal Vcsmin_S of the current limiter 24 is low, i.e., when the peak value of the current flowing through the first switch does not reach the first reference current value, the AND or gate 251 outputs a high level. Due to the second reference current value being higher than the first current value, the output signal Vcsmin_S of the comparator 243 is also a low level, and the OR gate 252 outputs a low level, indicating that the first switch is turned off, the output signal Vcot_S of the on-time generator 26 cannot change the output signal of OR gate 252. When the switching power supply is in the first operating mode, the output signal Turnoff_S of the second logic circuit 25 does not change based on the output signal Vcot_S of the on-time generator 26. Instead, the output signal Turnoff_S of the second logic circuit 25 changes based on the instant when the current detection value flowing through the first switch 11 rises to the first reference current value. When the output signal Vcsmin_S of the current limiter 24 is high, i.e., when the peak value of the current flowing through the first switch is greater than the first reference current value, the output of the AND gate 251 is controlled by Vcot_S, at this time, if the peak value of the current flowing through the first switch is smaller than the second reference current value, the output signal Vcsmax_S of the current limiter 24 is low, and at this time, the switched-mode power supply is in the second operating mode, the output signal Turnoff_S of the second logic circuit 25 changes based on the output signal Vcot_S. That is, the turning off instant of the first switch is determined by the output signal Vcot_S of the on-time generator 26. When the output signal Vcsmax_S of the current limiter 24 is a high level, that is, the peak value of the current flowing through the first switch is greater than the second reference current value (and the peak value of the current flowing through the first switch is also greater than the first reference current value), the signal Turnoff_S indicative of the turn-off instant for the first switch is a high level, indicating that the first switch is turned off. Through introducing the current detection signal, in particular under heavy load conditions, and controlling the turn-off instant for the first switch based on the results of current detection and comparison, the current flowing through the first switch is limited cycle-by-cycle, so the first switch and other components can be protected.

Figure 5:
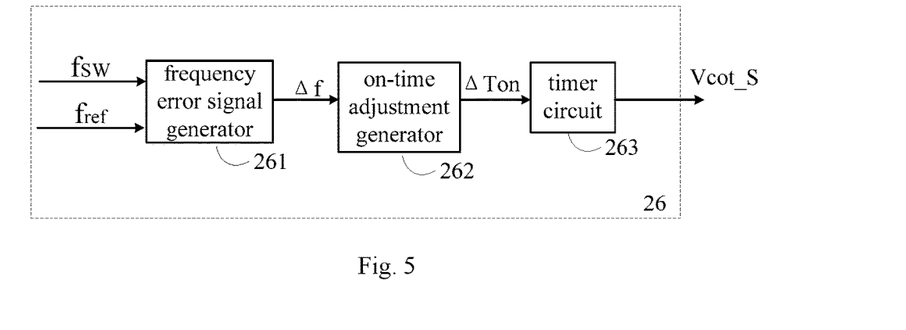
FIG. 5 is a structural schematic of an on-time generator according to an embodiment of the present invention.

Additionally, referring to FIG. 5, the on-time signal Vcot_S can be generated based on the difference between a reference frequency value and the detected switch frequency value of the first switch 11, thereby adaptively changing the turn-off instant of the first switch 11. The on-time generator 26 may include: a frequency error signal generator 261, which receives the first switching frequency signal $f_{SW}$ of the first switch and a reference frequency signal $f_{ref}$ and generate a frequency error signal $\Delta f$ characterizing a difference between the reference frequency signal and the first switching frequency signal; an on-time adjustment generator 262, which receives the frequency error signal $\Delta f$ and generates, from the frequency error signal $\Delta f$, an amount of on-time adjustment $\Delta Ton$ to be made for the current period; and a timer circuit 263 for changing the on-time signal Vcot_S based on the on-time adjustment $\Delta Ton$.

The on-time generator 26 may change the on-time signal Vcot_S based on the reference frequency signal $f_{ref}$ and the switching frequency signal $f_{SW}$ of the first switch 11 in particular by causing the timer to postpone the turn-off instant for the first switch by one unit interval when the switching frequency of the first switch is higher than the reference frequency and to advance the turn-off instant for the first switch by one unit interval when the switching frequency of the first switch is lower than the reference frequency. The unit interval may be determined by a timing increment set in the timer. In addition, it can also be set as a positive correlation between the advance/delay time of the first switch 11's turn off time and the difference between the switch frequency detection value and the reference frequency.

Figure 6:
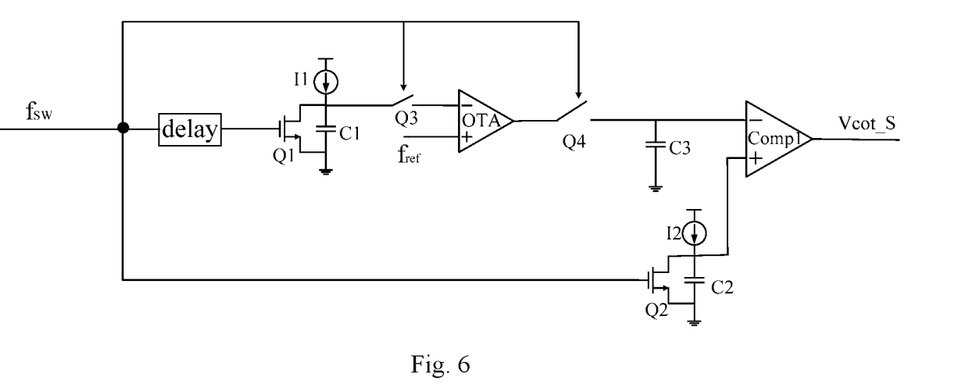
FIG. 6 is a schematic circuit diagram of the on-time generator according to an embodiment of the present invention.

In an exemplary embodiment of the present invention, there is provided a specific circuit implementation of the on-time generator 26, as shown in FIG. 6. FIG. 6 shows the specific circuit implementation of the on-time generator 26, which can positively correlate an amount of time that the turn-off instant for the first switch 11 is advanced or postponed to the difference between the switching frequency and the reference frequency. Specifically, as shown in FIG. 6, the on-time generator 26 may include a timing circuit consisting of a switch Q1, a capacitor C1 and a current source I1, which is configured to detect a voltage signal corresponding to the switching frequency in the previous switching period. This voltage signal is passed, together with a voltage signal corresponding to the reference frequency signal, through an operational transconductance amplifier (OTA), resulting in the generation of a current signal proportional to a difference between the two input voltage signals. The current signal is used to periodically charge a capacitor C3 via a switch Q4, and a voltage on the capacitor C3, which characterizes the sum of an amount of on-time adjustment ΔTon and the on-time Ton prior to the adjustment, is coupled to a negative input of a comparator Comp1. The amount of on-time adjustment ΔTon is proportional to the difference Δf between the switching frequency and the reference frequency. At the same time, the first switching frequency signal $f_{SW}$ of the first switch instructs a timing circuit consisting of a current source 12, a switch Q2 and a capacitor C2 to generate a voltage signal corresponding to the switching frequency and provides the voltage signal at a positive input of the comparator Comp1. An output signal of the comparator Comp1 is processed by edge detection and results in the generation of the signal Vcot_S consisting of a short pulse indicating the adjusted turn-off instant for the first switch 11.

The frequency error signal generator 261 and the timer circuit 263 may also be implemented by any other existing timing circuit, timer circuit or the like, such as a digitalized timing circuit. The on-time adjustment generator 262 may also be implemented by any other suitable combination of known logic or digital circuits, as long as the on-time generator 26 maintains the ability to adjust the turn-off instant for the first switch based on the difference between the switching frequency and the reference frequency, for example, by outputting a short pulse indicative of the turn-off instant for the first switch upon the expiry of an on-time period configured based on the difference between the switching frequency and the reference frequency. Such adaptive adjustment of the switch's on-time can fix the switching frequency at the predetermined value and thus effective avoid the generation of audible noise.

With continued reference to FIG. 1, the control circuit of the present invention may further include an off-time control unit 23, which may be implemented as a comparator having a negative input that receives the feedback signal Vfb characterizing the output voltage Vout of the switched-mode power supply and a positive input that receives the reference voltage signal Vref, as shown in FIG. 4, and configured to compare the feedback signal Vfb with the reference voltage signal Vref. If the feedback signal Vfb is lower than the reference voltage signal Vref, the comparator 23 may output a high level that turns on the first switch 11 to cause the output voltage to increase. The off-time control unit may also be implemented by any other suitable combination of analog or logic circuits known to those skilled in the art, or receive any other suitable signal characterizing the output voltage Vout and perform the function of turning on the first switch 11 when the output voltage Vout is lower than an expected value.

As shown in FIG. 4, the first logic circuit 22 may be implemented as, for example, an RS latch. Specifically, the signal Turnon_S indicative of the turn-on instant for the first switch may be coupled to an S terminal of the RS latch, and the signal Turnoff_S indicative of the turn-off instant for the first switch may be coupled to an R terminal of the RS latch so that the control signal Gate_S for turning on or off the first switch 11 is generated at a Q output terminal of the RS latch. It is worth noticing that in the specific implementations of the on-time generator 26 shown in FIGS. 5 and 6, according to the specific implementation method, the edge detection circuit may be set at the input and/or output terminals of each unit.

Figure 7:
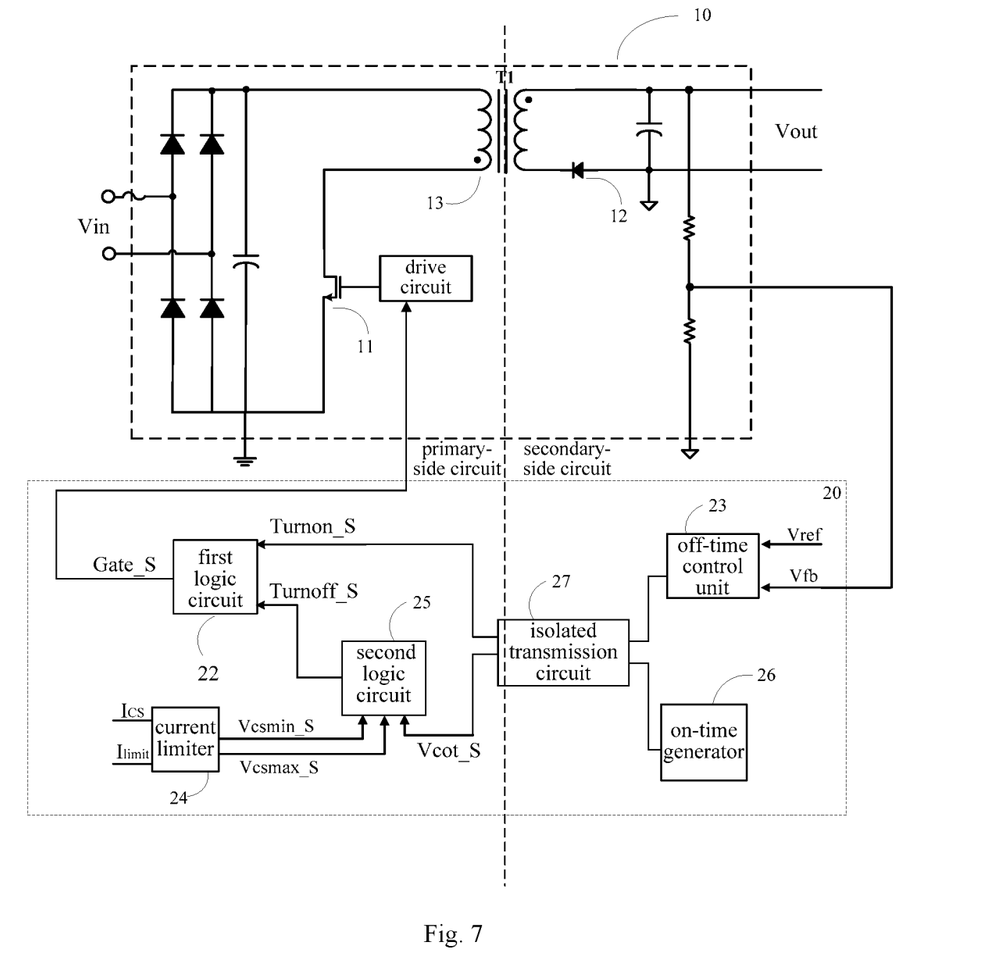
FIG. 7 is a structural schematic of a control system according to an embodiment of the present invention.

When used in a switched-mode power supply, the control circuit of the present invention as discussed above in connection with the foregoing embodiments may be configured in various ways and make up a control system together with the switched-mode power supply. As shown in FIG. 7, the control system includes a switching element (first switch) 11, a freewheeling element 12 and an energy storage element 13. For example, in the case of an isolated flyback converter, the on-time control unit 21 (including its components) and the first switch 11 may be both electrically connected to a primary-side circuit of the switched-mode power supply 10, and the off-time control unit 23 and the on-time generator 26 may be electrically connected to a secondary-side circuit of the switched-mode power supply 10. The signal Turnon_S for turning on the first switch generated by the off-time control unit 23 may be, for example, on-off-keying (OOK) modulated and transmitted in an isolated manner using electromagnetic coupling to the primary-side control circuit so as to work with the primary-side on-time control unit 21 to control the first switch 11. In some other embodiments, taking the example of the isolated flyback converter, as shown in FIG. 7 in which a dashed line marks a boundary between the primary-side and secondary-side circuits, the switching element 11 is connected to the primary-side circuit, and the freewheeling element 12 is a diode or switch connected to the secondary-side circuit, with the energy storage element 13 being implemented as a transformer T1 providing the isolation between the primary- and secondary-side circuits. The current limiter 24 and the second logic circuit 25 are electrically connected to the primary-side circuit, and the off-time control unit 23 and the on-time generator 26 are electrically connected to the secondary-side circuit. The off-time control unit 23 receives, from the secondary-side circuit, the signal Vfb characterizing the output voltage Vout and generates the signal Turnon_S for turning on the switching element 11. The signal Turnon_S is, together with the signal Vcot_S generated by the on-time generator 26, for example, OOK-modulated and transmitted in an isolated manner using, for example, electromagnetic coupling by an isolated transmission circuit 27 to the primary-side control circuit. The signal Vcot_S and the output signal Vcsmin_S and/or Vcsmax_S of the current limiter 24 work together under the control of the second logic circuit 25, after processed by the first logic circuit 22, thereby generating the signal Turnoff_S for turning off the switching element 11, which forms together with the signal Turnon_S transmitted to the primary-side circuit, the final control signal Gate_S for controlling operation of the switching element 11 via a drive circuit. In this configuration, every component configured for detection is arranged as near as possible to the signal source to be detected, resulting reduced interference from noise and enhanced signal detection and transmission reliability. The isolated transmission circuit 27 may separately modulate the signal Turnon_S generated by the off-time control unit 23 and the signal Vcot_S generated by the on-time generator 26, transmit them in an isolated manner to the primary-side circuit and then demodulate the signal Turnon_S. Alternatively, it may logically process and compose the signal Turnon_S generated by the off-time control unit 23 and the signal Vcot_S generated by the on-time generator 26 into one signal, modulate the composed signal, transmit it to the primary-side circuit in an isolated manner and then demodulate the composed signal. The composed signal may then be processed by rising edge detection and falling edge detection in the primary side circuit, resulting in the generation of proper signals for the following operation. Depending on the requirements of practical applications such as, for example, those on the signal chosen to be detected by the off-time control unit 23 or the current limiter 24, the components of the control circuit may be connected in a different manner in the isolated converter, and a different electromagnetic coupling means may be chosen for the isolated transmission circuit 27, such as, a coupling coil, capacitor, etc., and a detailed description thereof is omitted here. The switched-mode power supply 10 may be implemented as an isolated/non-isolated AC/DC converter configured to output a substantially constant output voltage Vout, or an isolated/non-isolated DC-DC converter also configured to output a substantially constant output voltage Vout. In addition, it is not limited to adopting a flyback or buck topology.

The control circuit provided in the above embodiments may be combined with one or more controlled switching elements to form a control system arranged in a single package in order to provide a higher degree of integration that is favorable to users and achieve reduced interference to the control signal. In this case, it works in the same or similar way as discussed above, and a duplicated description thereof is omitted here.

Figure 8:
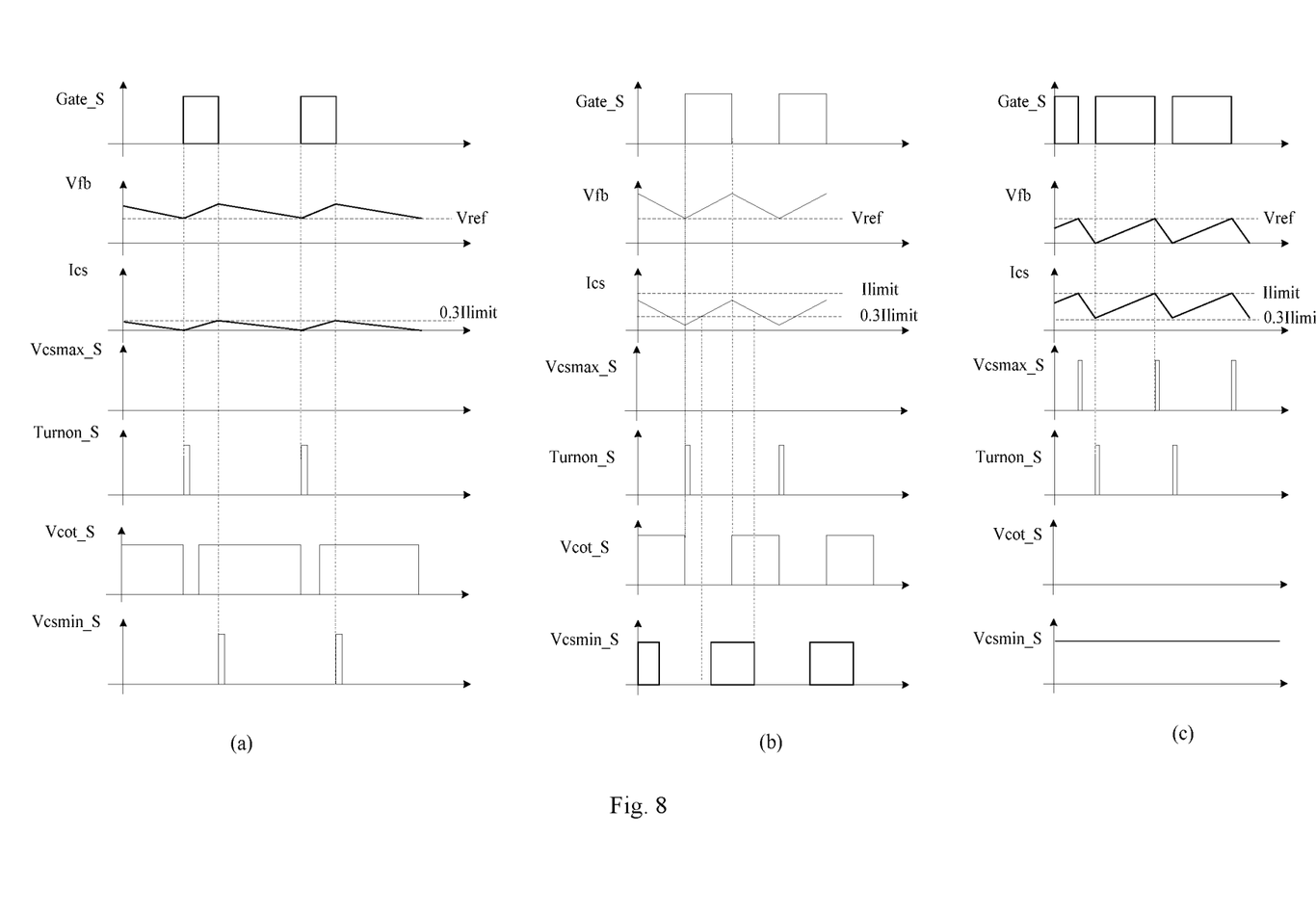
FIG. 8 schematically illustrates main waveforms according to an embodiment of the present invention.

FIG. 8 is a schematic diagram illustrating main waveforms according to an embodiment of the present invention. From FIGS. 8 and 4, operating principles of the main signals can be more clearly understood. When the feedback signal Vfb is lower than reference voltage signal Vref, the signal Turnon_S is output from the off-time control unit 23 as a short pulse for turning on the first switch 11. The on-time control unit 21 has three possible modes of operation. As shown in FIG. 8 (a), it is the first operating mode. At this mode, the current detection signal $I_{CS}$ flowing through the first switch is always smaller than the first reference current. the first reference current value may be, for example, $0.3*I_{limit}$, the output signal Vcsmin_S of the current limiter 24 is at a high level and the output signal Vcsmax_S is at a low level, the control signal Gate_S determines the turn-off instant for the first switch based on the instant when the value of the current detection signal $I_{CS}$ rises to the first reference current value, which corresponds to the instant when the control signal Gate_S in waveform 1 becomes low. As shown in FIG. 8 (b), it is the second operating mode. When the peak value of the current detection signal $I_{CS}$ reaches the first reference current value (such as $0.3*I_{limit}$) and is smaller than the second reference current value (such as $I_{limit}$), the signal Vcsmin_S output by the current limiter 24 is at a high level, while the signal Vcsmax_S is still at a low level, when the signal Vcot_S becomes a high level, and the output signal Turnoff_S by the on-time control unit 21 will turn to a high level, indicating the turning off instant of the first switch, that is, in this operating mode, the on-time signal Vcot_S determines the turning off instant of the first switch. As shown in FIG. 8 (c), when the peak value of the current detection signal $I_{CS}$ reaches the second reference current value (such as $I_{limit}$), the signal Vcsmax_S becomes a high level, and the output signal Turnoff_S by the on-time control unit 21 will turn to a high level, indicating the turning off instant of the first switch.

According to an embodiment of the present invention, the on-time length of the first switch may be less than or equal to a predetermined minimum on-time length (corresponding to the first reference current value), under a very light load condition in which there is only a very small current in the switched-mode power supply, it may happen that the on-time length in the frequency-locked mode is adjusted to or below the predetermined minimum on-time length. In this condition, it may be reasonable to switch operation from the frequency-locked mode to the frequency modulation control mode. In this case, although the switching frequency may drop into the audio range and audible noise may be generated, as there is only very little energy transferring in the switched-mode power supply system, the audible noise generated may be as insignificant as not noticeable by human ears. Thus, good user experience can be still ensured. Further, as switching loss under such conditions tends to be more significant than conduction loss, reducing the switching frequency is helpful in reducing loss and improving efficiency.

The embodiments disclosed herein are described in a progressive manner with the description of each embodiment focusing on its differences from others, and reference can be made between the embodiments for their identical or similar parts. Since the control system embodiments correspond to the control circuit embodiments, they are described relatively briefly, and reference can be made to the control circuit embodiments for details in the control system embodiments. Likewise, reference can be made to the control circuit embodiment and control system embodiment for details in the control method embodiments.

The foregoing description presents merely preferred embodiments of the present invention and is not intended to limit the scope of the present invention in any way. Any and all changes and modifications made by those of ordinary skill in the art in light of the above teachings without departing from the spirit of the present invention are intended to be embraced in the scope as defined by the appended claims.

What is claimed is:

1. A control circuit for a switched-mode power supply for driving a first switch in the switched-mode power supply to convert an input voltage into an output voltage, the control circuit comprising
    an on-time control unit, which receives a first signal and a second signal, the first signal characterizing a current limiting value and the second signal characterizing a current flowing through the first switch to select an operating mode of the switched-mode power supply based on the first signal and the second signal,
    wherein the on-time control unit compares the current flowing through the first switch with a first reference current value generated based on the current limiting value and the switched-mode power supply is configured to be in a first operating mode when a peak value of the current flowing through the first switch does not surpass the first reference current value, and
    wherein the on-time control unit determines a turn-off instant for the first switch based on the instant of that the current flowing through the first switch increases to the first reference current value in the first operating mode, so that the peak current flowing through the first switch is able to reach the first reference current value.

2. The control circuit of claim 1, wherein the on-time control unit further receives a third signal, the third signal indicating the turn-off instant for the first switch, when the peak current flowing through the first switch reaches the first reference value and is less than a second reference current value generated according to the current limit value, the switched-mode power supply is in a second operating mode, the on-time control unit determines the turn-off instant for the first switch based on the third signal.

3. The control circuit of claim 2, wherein the on-time control unit comprises an on-time generator, which receives a switching frequency detection signal and a reference frequency signal and generates the third signal based on a difference between the reference frequency signal and the switching frequency detection signal, thereby reducing the difference between the reference frequency signal and the switching frequency detection signal, wherein the switching frequency detection signal characterizes the switching frequency of the first switch, and the reference frequency signal represents a target frequency value.

4. The control circuit of claim 2, wherein the on-time control unit comprises an on-time generator, which generates the third signal based on a preset reference value, so that the switching frequency of the first switch remains unchanged.

5. The control circuit of claim 2, wherein the first reference current value is smaller than the second reference current value.

6. The control circuit of claim 1, wherein the on-time control unit comprises a current limiter, which receives the first signal and the second signal, and generates a first current limiting signal and a second current limiting signal, wherein the first current limiting signal indicates an instant when the current flowing through the first switch increases to the current limiting value, and the second current limiting signal indicates an instant when the current flowing through the first switch increases to the first reference current value.

7. The control circuit of claim 6, wherein the current limiter comprises a first comparison unit and a second comparison unit, the first comparison unit receiving the first signal and the second signal, and generating a first current limiting signal when the current flowing through the first switch is greater than the current limiting value; the second comparison unit receiving the first reference current value and the second signal, and generating a second current limiting signal when the current flowing through the first switch is greater than the first reference current value.

8. The control circuit of claim 3, wherein the on-time generator comprises:
a frequency error signal generator, which receives the switching frequency detection signal and the reference frequency signal and generates a frequency error signal characterizing the difference between the reference frequency signal and the switching frequency detection signal,
an on-time adjustment generator, which receives the frequency error signal and generates, based on the frequency error signal, an amount of on-time adjustment to be made to a current period, and
a timer circuit, which generates the third signal based on the amount of on-time adjustment.

9. The control circuit of claim 8, wherein the amount of on-time adjustment generated based on the frequency error signal causes the timer circuit to postpone the turn-off instant for the first switch when the frequency error signal indicates that the switching frequency is higher than the target frequency and to advance the turn-off instant for the first switch when the frequency error signal indicates that the switching frequency is lower than the target frequency.

10. The control circuit of claim 1, further comprising an off-time control unit, which receives a fourth signal characterizing the output voltage, compares the fourth signal with a reference voltage signal, and generates a signal indicative of a turn-on instant for the first switch.

11. The control circuit of claim 10, further comprising a first logic circuit, which receives both the signal indicative of the turn-off instant for the first switch and the signal indicative of the turn-on instant for the first switch and generates a control signal for the first switch.

12. A control system for a switched-mode power supply, the control system comprising a switching element, a freewheeling element and an energy storage element, the control system configured to convert an input voltage into an output voltage,
the control system further comprising an on-time control unit, the on-time control unit receiving a first signal and a second signal, the first signal characterizing a current limiting value and the second signal characterizing a current flowing through the first switch to select an operating mode of the switched-mode power supply based on the first signal and the second signal,
wherein the on-time control unit compares the current flowing through the first switch with the first reference current value generated based on the current limiting value and the switched-mode power supply is configured to be in a first operating mode when a peak value of the current flowing through the first switch does not surpass the first reference current value, and
wherein the on-time control unit determines the turn-off instant for the first switch based on the instant of that the current flowing through the first switch increases to the first reference current value in the first operating mode, thereby maintaining that the peak current flowing through the first switch is not lower than the first reference current value.

13. The control system of claim 12, wherein the switched-mode power supply is an isolated switched-mode power supply comprising a primary-side circuit and a secondary-side circuit, which are connected to different ground terminals, wherein the switching element and the on-time control unit are both electrically connected to the primary-side circuit, and the freewheeling element is electrically connected to the secondary-side circuit.

14. The control system of claim 12, wherein the on-time control unit comprises:
an on-time generator, which generates a third signal, the third signal indicating the turn-off instant for the first switch;
a current limiter, which receives the first signal and the second signal, and generates a first current limiting signal and a second current limiting signal, wherein the first current limiting signal indicates the instant when the current flowing through the first switch increases to the current limiting value, and the second current limiting signal indicates the instant when the current flowing through the first switch increases to the first reference current value; and
a second logic circuit, which receives the first current limiting signal, the second current limiting signal and the third signal, and indicates the switching element to be turned off when the first current limiting signal arrives if the third signal is received before the first current limiting signal.

15. The control system of claim 14, wherein the switched-mode power supply is an isolated switched-mode power supply comprising a primary-side circuit and a secondary-side circuit, which are connected to different ground terminals, and wherein the switching element, the current limiter and the second logic circuit are all electrically connected to the primary-side circuit, and the on-time generator is connected to the secondary-side circuit.

16. The control system of claim 12, wherein the switched-mode power supply is a non-isolated switched-mode power supply.

17. A control method for a switched-mode power supply for driving a first switch in the switched-mode power supply to alternately turn on and off, thereby converting an input voltage into an output voltage, the control method comprising:
   detecting a current flowing through the first switch;
   when a peak value of the current flowing through the first switch does not surpass the first reference current value, configuring the switched-mode power supply to be in a first operating mode, in which the on-time control unit determines the turn-off instant for the first switch based on the instant of that the current flowing through the first switch increases to the first reference current value, thereby maintaining that the peak current flowing through the first switch is not lower than the first reference current value.

18. The control method of claim 17, wherein when the current flowing through the first switch reaches a second reference current value, the turn-off instant for the first switch is determined based on the instant of time when the current value reaches the second reference current value.

19. The control method of claim 18, wherein when the peak current flowing through the first switch reaches the first reference value and is less than the second reference current value generated according to the current limit value, the switched-mode power supply is in a second operating mode, in which the on-time control unit determines the turn-off instant for the first switch based on a third signal.

* * * * *